(12) United States Patent
Pyle

(10) Patent No.: US 11,704,740 B2
(45) Date of Patent: Jul. 18, 2023

(54) VEHICLE REPAIR ESTIMATION SYSTEM AND METHOD

(71) Applicant: Jonathan Pyle, Longview, TX (US)

(72) Inventor: Jonathan Pyle, Longview, TX (US)

( * ) Notice: Subject to any disclaimer, the term of this patent is extended or adjusted under 35 U.S.C. 154(b) by 0 days.

(21) Appl. No.: 17/330,933

(22) Filed: May 26, 2021

(65) Prior Publication Data

US 2021/0374871 A1 Dec. 2, 2021

Related U.S. Application Data

(60) Provisional application No. 63/031,425, filed on May 28, 2020.

(51) Int. Cl.
| | |
|---|---|
| *G06Q 40/08* | (2012.01) |
| *G06Q 10/10* | (2023.01) |
| *G06Q 10/20* | (2023.01) |
| *G06T 7/00* | (2017.01) |
| *G06T 17/00* | (2006.01) |
| *G06Q 30/0283* | (2023.01) |

(52) U.S. Cl.
CPC ............ *G06Q 40/08* (2013.01); *G06Q 10/10* (2013.01); *G06Q 10/20* (2013.01); *G06Q 30/0283* (2013.01); *G06T 7/0004* (2013.01); *G06T 17/00* (2013.01); *G06T 2207/30252* (2013.01)

(58) Field of Classification Search
CPC ........ G06Q 40/08; G06Q 10/10; G06Q 10/20; G06Q 30/0283; G06T 7/0004; G06T 16/00; G06T 2207/30252

USPC ...................................................... 705/3–44
See application file for complete search history.

(56) References Cited

U.S. PATENT DOCUMENTS

| | | | | |
|---|---|---|---|---|
| 9,824,453 | B1 * | 11/2017 | Collins ................. | G06Q 40/08 |
| 10,657,707 | B1 * | 5/2020 | Leise ..................... | G06T 17/00 |
| 10,713,839 | B1 * | 7/2020 | Summers ............... | G06T 17/00 |
| 11,288,789 | B1 * | 3/2022 | Chen ...................... | G06T 7/001 |
| 2012/0076437 | A1 * | 3/2012 | King ...................... | G06Q 40/08 |
| | | | | 382/286 |
| 2017/0293894 | A1 * | 10/2017 | Taliwal ................. | G06V 20/20 |
| 2018/0260793 | A1 * | 9/2018 | Li ......................... | G06N 7/005 |
| 2019/0066408 | A1 * | 2/2019 | Vijayan ................. | G07C 5/085 |
| 2020/0327743 | A1 * | 10/2020 | Cannarsa .............. | G06Q 40/08 |

OTHER PUBLICATIONS

"Auto Insurance Quotes for Custom Vehicles—Find Coverage Fast", PR Newswire, New York, Mar. 4, 2016.*
Reich-Hale, David, "State Farm spurs auto policy questions", National Underwriter, Property & Casualty/risk & Benefits Management ed. 104.2:2, 18, ALM Media Properties, LLC. Jan. 10, 2000.*

* cited by examiner

*Primary Examiner* — Frantzy Poinvil
(74) *Attorney, Agent, or Firm* — Gregory Perrone; Bobby W. Braxton; Braxton Perrone, PLLC

(57) ABSTRACT

A vehicle repair estimate platform for collecting vehicle repair data from a depth and dimension measuring camera and generating a manipulatable three-dimensional model of the vehicle damage. An estimate is generated based on insured claim attributes and predefined vehicle damage parameters, and the estimate tagged for periodic selection for inclusion in a wide area repair estimate matrix.

18 Claims, 4 Drawing Sheets

VEHICLE REPAIR ESTIMATION SYSTEM AND METHOD

CROSS-REFERENCE

This application claims priority to U.S. Provisional Patent Application No. 63/031,425 filed May 28, 2020, which is incorporated in its entirety herein by reference.

TECHNICAL FIELD

This disclosure relates generally to systems and methods for providing uniform estimates for vehicle repair.

DESCRIPTION OF RELATED ART

Vehicle repairs made pursuant to an insurance claim made by the vehicle owner entail a complicated process. Often the vehicle owner makes a claim under the insurance policy directly to the insurance company representative following an event that results in vehicle damage. An event such as a collision can cause one or more dents in the vehicle and a wide variety of damage. Another such event is a hailstorm that can cause multiple dents in the vehicle. The level of coverage that the insurance company will provide to the vehicle owner is often the product of subjective evaluation by an insurance adjuster of the cost to repair the dent or dents that is based on the size of the dent (its length, width and depth) and the material of the vehicle panel that has the dent. This can result in great inconsistency in pricing repair work. It is desirable, therefore, to have a system that provides consistent and accurate estimates of repair work on a damaged vehicle.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Figure 1:
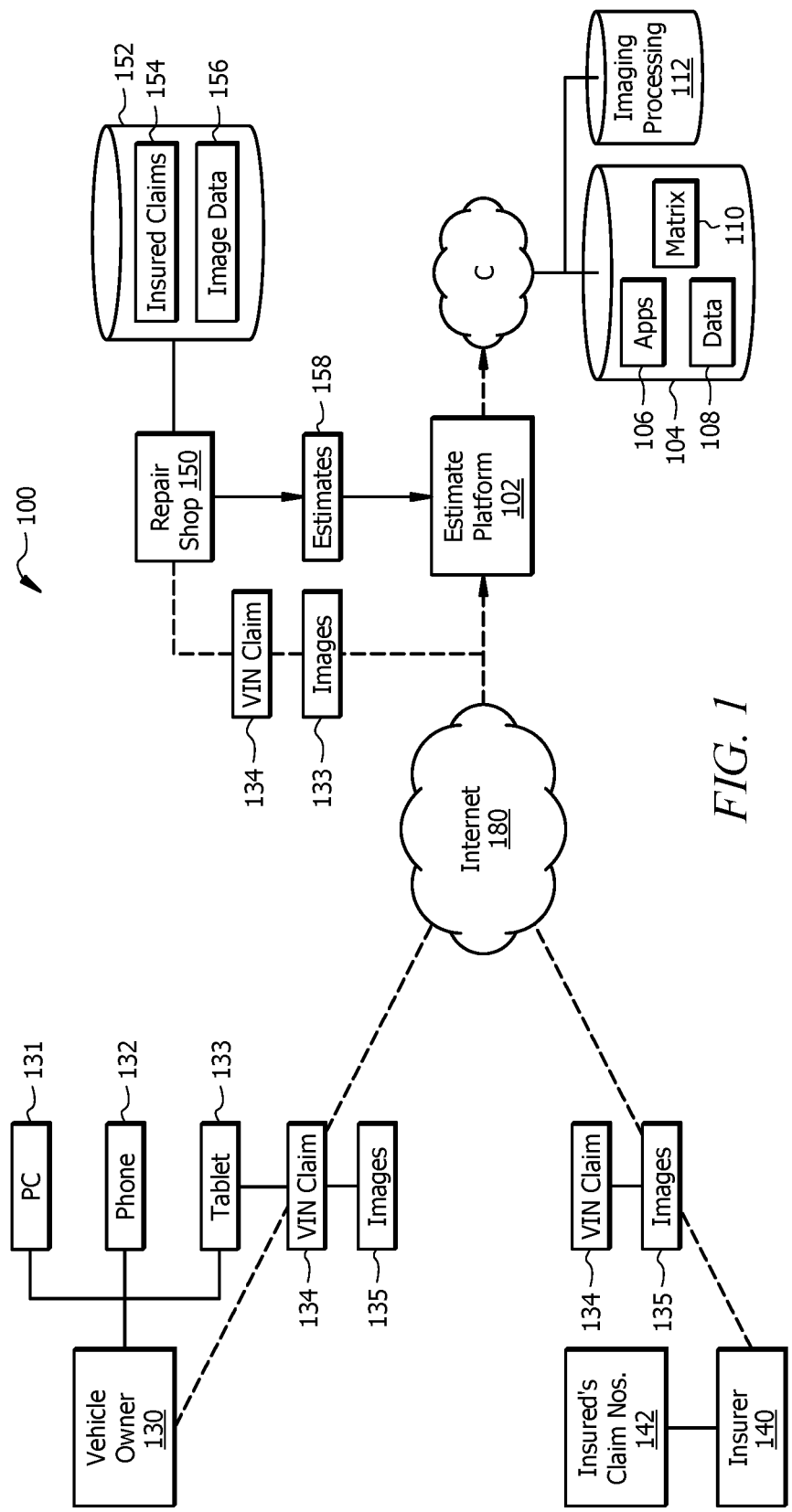
FIG. 1 illustrates a repair estimate generating system according to an embodiment.

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Embodiments of the present disclosure and its advantages are best understood by referring to FIGS. 1 through 4 of the drawings, like numerals being used for like and corresponding parts of the various drawings.

In one embodiment, the system an application program executed on a computer, smart phone, tablet or any device having communication network connectivity via a wired or wireless network and/or internet capability. The application program operates as a platform through which vehicle repair requests are processed and estimates or bids reflecting the cost to perform the repair work are communicated.

It is contemplated that the context in which the repair estimate information is exchanged is the vehicle insurance claim setting. In the vehicle insurance claim setting, a vehicle owner holding a vehicle policy that covers repairs for body damage submits a claim to his or her insurance company that issued the policy in the event of vehicle damage. One such event that invokes many insurance claims is a collision involving the vehicle with another vehicle or an object. Another such event is a hailstorm. A vehicle that endures a collision can have one or more large or small dents. A vehicle that experiences a hailstorm is often left with dents over much of the vehicle's exterior body. Once a vehicle owner makes an insurance claim, the claim is assigned to an adjuster to determine the amount necessary for the repair and the amount of coverage the insurance company will provide under the policy. In cases involving a collision, subjective, arbitrary, and antiquated methods are used to determine the cost estimate of the repair. For example, a vehicle in a collision may have dents in fenders or door panels or damage that spans the roof, trunk, and hood. For the sake of convenience, an adjuster may arbitrarily designate the span of his or her hand from the end of the thumb to the end of the pinky as a type of measuring tool to evaluate the cost of repair for a dent. This arbitrary practice is based in large part on the size of the adjuster's hand. Based on the rough size of the adjuster's hand, the adjuster determines how many hand areas cover the boundary of the dent. The adjuster then simply multiplies the number hand areas that cover the dent by some hourly price for the job for each dent. This product is the amount of the repair estimate that the insurance company will cover.

This method is fraught with problems. First, the hand size varies greatly from one adjuster to the other. This literal "rule of thumb" results in wildly inconsistent and often unfair pricing to both the vehicle owner and the insurer. Second, an adjuster is often assigned to a set geographic region. Based on the familiarity with local body repair shops, the estimate can be too high or too low depending on whether the relationship between the adjuster and body shop is positive or negative.

The embodiment of the present invention, therefore, is a software platform for receiving and processing claims for vehicle body repair according to a uniform and consistent method for evaluating estimates. The system includes storage, via the cloud or other suitable storage means for receiving claims data over a communication protocol, such as the IP protocol for communicating over a wide area network such as the internet. Once a claim is made, an vehicle owner making the claim is given a claim number. The vehicle owner, through a user interface dedicated to making and processing estimate requests for repairs, can enter unique information such as the claim number and a vehicle identification number (VIN). The user can also enter a short description of the areas of the vehicle that have been damaged, as well as photographs with a device such as a smart phone on which the application program for the repair estimate platform is installed.

The vehicle owner information, such as the insurance company through which the claim was made and the geographic location of the vehicle owner, can result in identification of various repair vendors who can offer repair services. In one embodiment, other service providers are selected by the vehicle owner. Once a repair shop is selected, the repair shop can upload photographs of the damaged areas of the vehicle taken by the vehicle owner via smart phone on which the application program is installed. Once received by the repair shop, a repair order number is generated that can include an estimate for the repair job.

Through the application program, one or more of the vehicle owner, insurer and repair shop user can take a photograph of the damaged areas of the vehicle with a depth sensing camera enabled device, such as a smart phone. The depth sensing camera enables identification of the depth of a dent on the vehicle. This enables accurate and uniform estimates based on precise measurement of the length, width, and depth of the dent. In other embodiments, data from Time of Flight and LiDAR enabled devices can generate more precise measurement information for providing estimates. Correction algorithms are included in the application programs executed on the platform to account for any differences in camera quality on the vehicle owner's end when photographs are taken. In one embodiment, a pre-defined tolerance percentage is applied to measurement data to take into account different quality in camera equipment.

Once a vehicle owner's claim number is established, the images of the damages are communicated to repair shops that are enrolled in and participate in the presently described repair estimate platform. Sensor and image data is sent to the various participating repair shops that communicate with vehicle owner and insurance companies via the cloud or other suitable wide area network communicate channels. In an embodiment, messages communicated between vehicle owner, repair facility and insurance carrier are transmitted via email message, SMS messaging, or other communication protocol. Such messages optionally include a link that provides access to review damage data, such as the claim and vehicle information as well as photographs and the repair estimate. User can also insert text messages or comments via a dedicated window in the so designated in the user interface.

Software application as a service operating on the cloud process image and sensor data. A three-dimensional model of the dent or dents is created using appropriate modeling software. The subject dent for repair is identified on the specific vehicle panel and presented on the user display. The software calculates and provides accurate dimension data of the dent subject to repair. For multiple dents, such as those incurred in a hail storm, dimension data for the multiple dents are provided and aggregated for purposes of the price estimate. For larger dents, accurate dimension data is also generated.

The software application program that processes sensor and image data also includes code for generating a pricing matrix that executable and applicable across multiple repair shops across multiple markets. This pricing matrix can take into account market conditions such as labor costs, material costs, demand for services and the like. The pricing matrix is developed by cumulative pricing data from estimates generated by the three-dimensional modeling process described above. That is, estimates are provided on a case-by-case basis based on image and measurement data that has a high level of specificity and granularity in order to avoid subjective and arbitrary methods of pricing. Once a high volume of estimates is generated, data accumulated is used to generate a price matrix. This price matrix provides an across the board pricing template based on pricing variables, including length, width, depth, height and volume of dents. Another variable is location of a dent. Dents located along body lines of the vehicle are more costly to repair than a dent residing in the center of a body panel. As such, pricing of a dent is increased according to pricing matrix based on a distance from a body line or according to the length of a body line residing within the perimeter or outline of a dent.

The type of panel substrate is another variable that is determinative of price. Different materials are more costly to repair depending on their physical properties. The VIN data associated with a vehicle informs of the vehicle's specifications, including the panel material. Pricing is a function of factors, including repair time. The repair time, and thus pricing, of an aluminum panel is some percentage higher than the repair time for an identically sized dent in a mild steel panel.

In one embodiment, a participating repair shop will prepare an estimate in the customary manner and submit the estimate to the estimate platform via a business message suite. Estimate line items with repair times are tagged for capture by the aggregation software used for developing the matrix. Tagging is performed for initial estimates as well as any supplemental estimates and final invoices in order to reflect most accurate pricing information.

The user interface for the estimate platform presently described can include a digital ruler to measure dents size manually with an interface device such as a mouse to mark various points of the dent for digital measurement. The three-dimensional model of the dent can be moved and manipulated by the user to provide the repair facility with a better sense of the extent of the damage. The user can also toggle a damage heatmap feature that provides indication of panels having higher concentration of damage.

FIG. 1 is a network diagram of an estimate generating platform according to an embodiment of the present invention. Estimate generating system 100 includes estimate platform 102. Estimate platform 102 includes processing capability and can communicate with remotely stored databases 104 on which application programs 106, data 108 relating to insured claims and estimates and pricing matrices 110 are stored. Estimate platform 102 also comprises image processing software 112 that is also locally or remotely in communication with estimate platform 102 via the cloud or other suitable local or wide area network communication means. Estimate platform 102 comprises a processor and other hardware and software known in the art that allows estimate platform 102 to function among other things as a transceiver for transmitting and receiving information.

Estimate platform 102 communicates with various participants in the insurance claim and estimate generation and processing process, including vehicle owners making claims, insurance companies, and participating repair facilities. Vehicle owners 130 submit various information, such as claims and VIN information 134 to insurers 140 via wide area network communication protocol such as the IP protocol. Vehicle owner 130 submits claim 134 to insurer 140 and receives a claim number from insurer 140. Insurer 140 generates the claim number and saves vehicle owner information and the claim number locally or remotely in data store 142. Vehicle owner 130 receiving a claim number from insurer 140 submits the claim number and VIN data 134 to estimate platform 102 via a personal computer 131, mobile phone 132 such as a smart phone, table 133 or other device. These devices 131, 132 and 133 operate as transceivers, allowing transmission and receipt of data in various forms. Vehicle owner 130 also sends images 135 to estimate platform 102. Images 135 are recorded by the vehicle owner's device that is configured with an application program downloaded from the estimate platform operator that enables the vehicle owner's camera to operate as a depth sensing camera. The depth sensing camera generates images 135 having measurable properties. In the case of vehicle damage, images 135 are processed to determine the length, width and depth of a dent or other area of interest. The length of body lines of the vehicle passing through a dent are also recorded to generate more specific estimate data. Although in this embodiment images of the damage are sent by vehicle owner 130, images of the damages in some embodiments are also be taken and/or sent by insurer 140 and/or repair shop 150.

Once image data 135 and claim and VIN data 134 are received by estimate platform 102, based on the vehicle owner's information, one or more repair shops are identified as potential repair shops for a particular job. Estimate platform 102 receives claim and VIN data 134 and images 135 and stores the information in local or remote data store 104. Data store 104 is cloud storage or other suitable remote or local storage means. Store 104 also contains software that includes instructions or code executable by a processor to generate information from images 35 and claim information 134, including information concerning the damage and the vehicle. In particular, based on images 135 collected from depth sensing camera enabled on the vehicle owner's device, the estimate platform extracts dimension data of the dent or dents depicted in the images. The estimate platform also retrieves vehicle data identifiable from the VIN, such as vehicle panel material, vehicle dimensions, paint color and the like.

Repair shop platform 150 includes processing capability and data store 152 on which vehicle owner claims 154 and image data 156 received from vehicle owner 130 or estimate platform 102 are stored. Repair shop platform 150 sends estimates 158 for repair jobs generated from data received from vehicle owner user 130 or estimate platform 102 in the form of VIN data 134 and image data 135.

Application programs running on estimate platform can calculate the number of dents on a panel according to image data sent to the platform by the vehicle owner user. From the number of dents an estimate for repair is generated based on the material of the area in need of repair and other variables. The software can also serve to create an estimate matrix over time that aggregates estimate data from many repair shops for vehicles of different types that have suffered a variety of damage. Over time, the matrix serves to provide more consistent and predictable estimates that eliminate the guess work and subjectivity of different adjusters negotiating with different repair shops.

Figure 2:
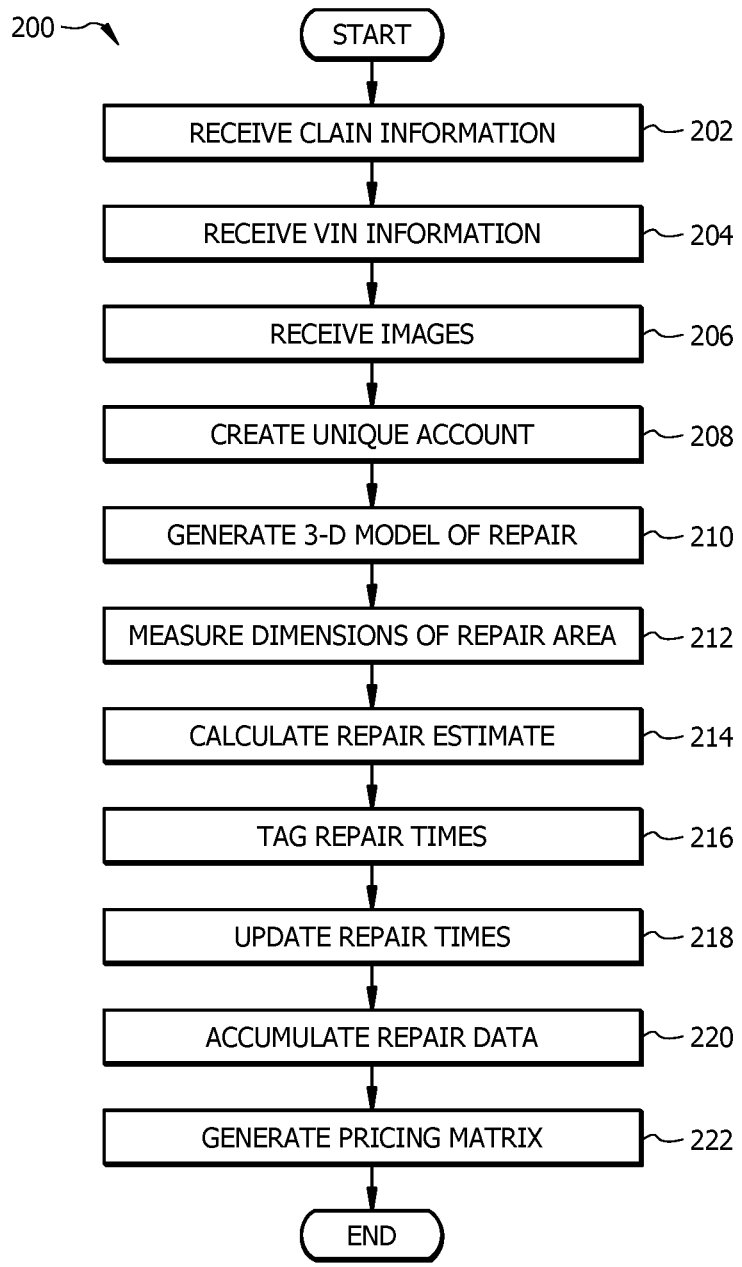
FIG. 2 is a flowchart of a method performed by the system according to an embodiment.

FIG. 2 depicts a flowchart of a process performed according to an embodiment of the presently described estimate platform. The process of FIG. 2 begins with step 202 with the estimate platform receiving claim information from the vehicle owner or insurance carrier. At step 204, the estimate platform receives VIN information. Once the vehicle owner submits VIN information and a claim number is established, the vehicle owner can submit images of the area of the vehicle in need of repair at step 206. These images are recorded with a depth sensing camera enabled by an application running on a user device such as a smartphone. Time of flight and LiDAR enabled devices can also be used to take digital images of the area of repair. At step 208, a unique account for the claim and the particular vehicle owner making it is generated. This unique account reflects the VIN, the claim number and a representation of the image data submitted by the vehicle owner.

At step 210 the estimate platform generates a three-dimensional model of the vehicle and its areas of repair. This model can include a graphical image of areas in need of repair that can be manipulated, reconfigured, or enhanced by the repair shop for purposes of providing an estimate. At step 212, the estimate platform makes measurements of the dimensions of the repair areas. This is achieved through activation of a user interface device, such as a computer mouse, stylus or other suitable point and select device. The user can digitally mark areas on the image that signify the boundaries of the dent and the software will determine the exact dimensions of the area of repair. In some embodiments, the three-dimension image includes a heatmap filter toggle to allow users to identify the higher areas of concentration of damage in formulating an estimate. The user interface can include a digital ruler to measure the dent manually. The interface also allows the user to click and drag all or part of the image to better view the area in need of repair. Based on these dimensions, estimate platform, generates a repair estimate at step 214. The repair estimate includes an hourly component that at step 216 is tagged for later use in creating other estimates and is aggregated for creation of a global pricing matrix.

At step 218 aggregated repair times are updated with information concerning the new claim and repair estimate. At step 220, aggregated repair data is updated to reflect the current job estimate. The aggregated repair data is updated to reflect statistics associated with the most recent job estimate, including the dimension data for the damage, the pricing of the estimate, the type of vehicle and the materials at issue and the like. At step 222, the process concludes with generating and updating a pricing matrix based on accumulated and newly generated estimates and associated data. This pricing matrix is dynamic and reflects current market conditions and accounts for most recent estimates. The pricing matrix generated by the estimate platform is then used as a guide for localized or unique claims and repairs and used to provide more granular analysis or repair data.

The presently described insurance claim information processing system, comprises a processor programmed to function as an acquisition unit that acquires vehicle damage information requiring repair from a plurality of uniquely identified vehicles having different vehicle damage regions. The vehicle damage information comprises images of vehicle damage information obtained from a depth and dimension measuring camera. A job order generating unit creates a repair job uniquely associated with the acquired vehicle damage information. The processor operates an association unit that correlates the job order to an insured claim. The processor further serves as a model generating unit that creates a three-dimensional model of the vehicle damage region representing a length, a width and a depth of the vehicle damage region and includes a measuring unit that measures the length, the width and the depth of the vehicle damage region.

The processor further provides a three-dimensional model manipulator unit for revision of the three-dimensional model of the vehicle damage region. An estimate assigning unit assigns a cost estimate according to the measured length, width and depth of the vehicle damage region based on insured claim attributes associated with the insured claim and predefined parameters of the vehicle damage. A tagging unit that designates the cost estimate for periodic capture by an aggregation unit that creates a wide area matrix of vehicle damage repair pricing estimates.

The three-dimension model manipulator unit further comprises a toggle for identification of the vehicle damage region having more than a predefined number of areas for repair. The insured claim attributes consist essentially of a make of the vehicle and a geographic location of the vehicle. The predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle.

The processor resides in a smart phone or a personal computer or the like.

The present invention in one embodiment includes a non-transitory computer-readable information storage media, having stored thereon instructions, that when executed by one or more processors in a transceiver, cause to be performed a method comprising steps. These steps include acquiring vehicle damage information requiring repair from a plurality of uniquely identified vehicles having different vehicle damage regions, the vehicle damage information comprising images of vehicle damage information obtained from a depth and dimension measuring camera. Generating a job order uniquely associated with the acquired vehicle damage information. Correlating the job order to an insured claim. Generating a three-dimensional model of the vehicle damage region representing a length, a width and a depth of the vehicle damage region. Measuring unit the length, the width and the depth of the vehicle damage region. Manipulating the three-dimensional model for revision of the three-dimensional model of the vehicle damage region. Assigning a cost estimate according to the measured length, width and depth of the vehicle damage region based on insured claim attributes associated with the insured claim and predefined parameters of the vehicle damage. Designating, the cost estimate for periodic capture by an aggregation unit that creates a wide area matrix of vehicle damage repair pricing estimates.

In one embodiment, the manipulating of the three-dimension model manipulator unit further comprises activating identification of the vehicle damage region having more than a predefined number of areas for repair. The insured claim attributes consist essentially of a make of the vehicle and a geographic location of the vehicle. The predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle. The processor resides in a smart phone or a personal computer.

The presently described insurance claim processing system, in an embodiment comprises a depth and dimension measuring camera and a transceiver for transmitting images of vehicle damage captured by the depth and dimension measuring camera. The system further comprises a three-dimensional model module for creating a three dimensional model of the vehicle damage images captured by the depth and dimension measuring camera and a manipulation module for modifying the three dimensional model. It further comprises a database for storage of information associated with an insured claim uniquely associated with each image of vehicle damage captured by the depth and dimension measuring camera and an estimate calculator for assigning a cost estimate to a job created for repair of the vehicle damage according to comparison of vehicle damage attributes and predefined estimate attributes. It further comprises an estimate aggregator for periodically collecting select cost estimates and supplementing a pre-existing wide area estimate resource.

In an embodiment, the manipulating of the three-dimension model manipulator unit further comprises activating identification of the vehicle damage region having more than a predefined number of areas for repair. The insured claim attributes consist essentially of a make of the vehicle and a geographic location of the vehicle. The predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle. The processor herein described resides in a smart phone or a personal computer or the like.

While the above-described flowcharts have been discussed in relation to a particular sequence of events, it should be appreciated that one or more changes to this sequence can occur without materially effecting the operation of the embodiments. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable. Moreover, the steps in the flowcharts are optional, with some of or all of the steps being performed.

The above-described methods and systems and can be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug® transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug® or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device (or one or more equivalent means) capable of implementing a state machine that is in turn capable of implementing the methodology illustrated herein can be used to implement the various communication/measurement methods, protocols, and techniques according to this invention.

Furthermore, the disclosed methods may be readily implemented in software stored on a non-transitory computer-readable storage media using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Figure 3:
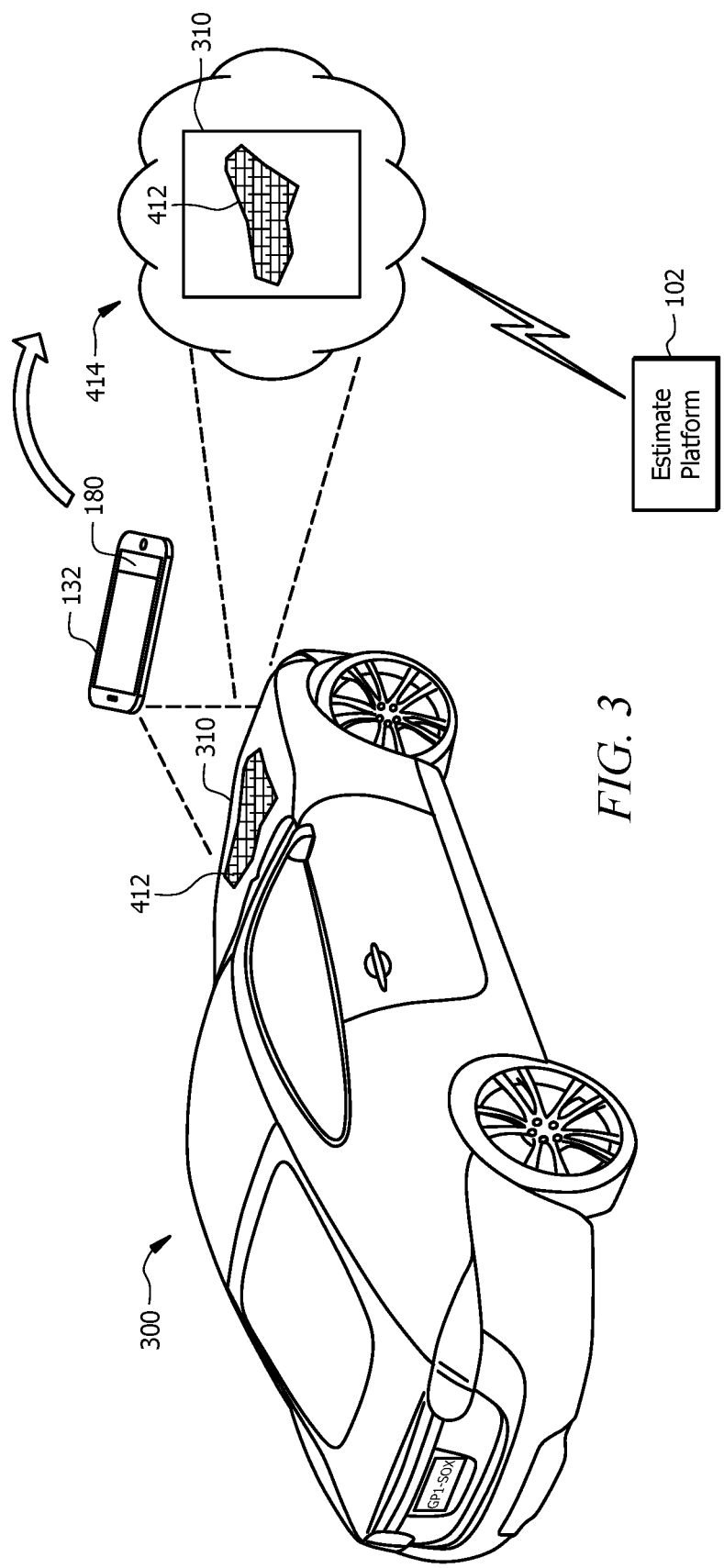
FIG. 3 is a schematic of an image capture process of a vehicle having damage according to an embodiment.

FIG. 3 depicts transmission of an image showing an area of damage according to an embodiment of the invention. In FIG. 3, car 300 has endured a large dent 412 from an event such as a collision. Dent 412 can cover a distinct are of the vehicle or cover much of the vehicle, including one particular panel 310 that is the car's hood. A vehicle owner having a smart phone 132 equipped with application program 180 that enables depth and dimension identifying photography takes an image of panel 310 that includes dent 412. A cropped image 414 of panel 310 containing dent 412 is generated by application program 180. The vehicle owner can then transmit the data file containing cropped image 414 to estimate platform 102, where the image is stored and processed according the methods herein described. As discussed, an image and subsequently cropped image are sent to estimate platform 102 by the insurer and repair shop as well. Several such images are taken by the vehicle owner and cropped images of this sort are created and sent to estimate platform in order to provide an accurate account of the size of the dent and its location on the vehicle. This processing enables generation of an estimate for the repair work by extracting precise measurements of the dent or dents to be repaired.

Figure 4:
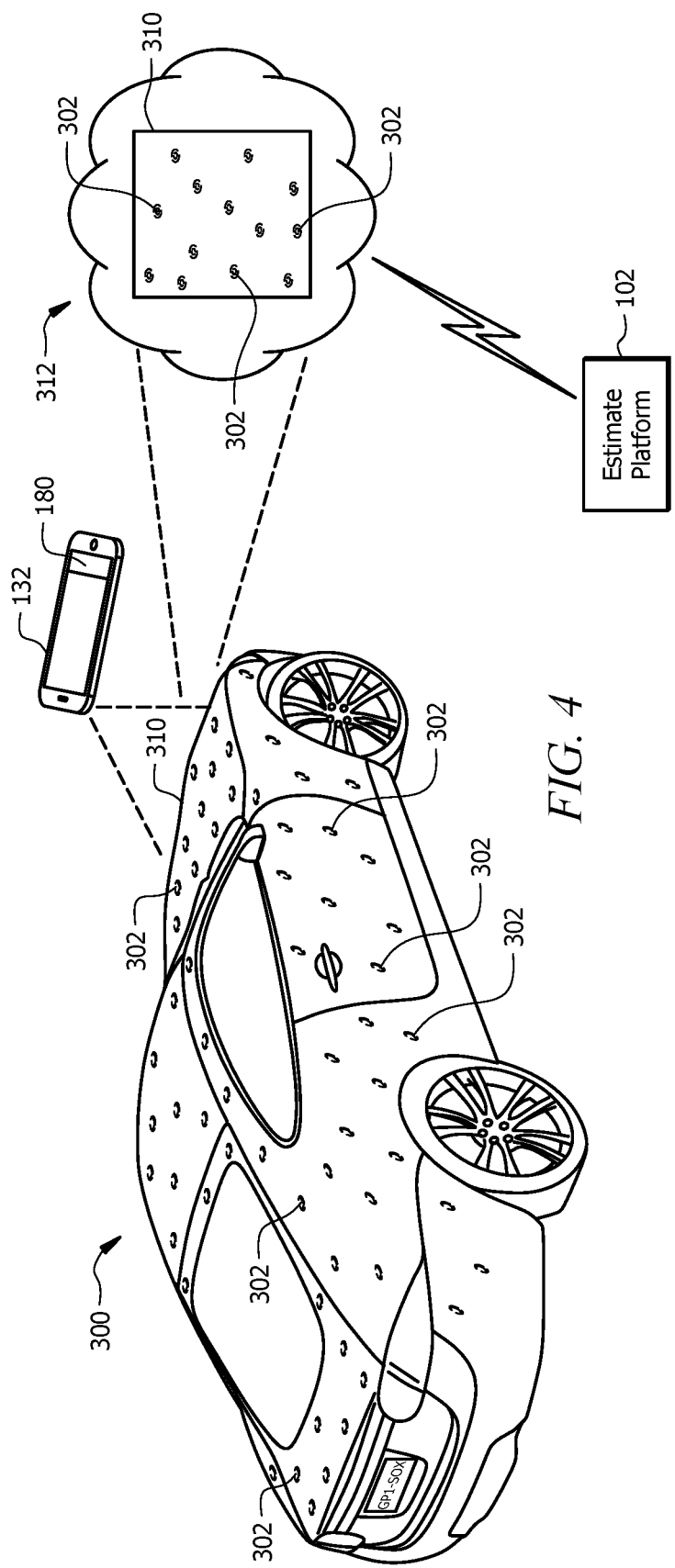
FIG. 4 is a schematic of an image capture process of a vehicle having damage according to an embodiment.

FIG. 4 depicts transmission of an image showing concentrated areas of damage according to an embodiment of the invention. In FIG. 4, car 300 has endured a number of dents 302 from an event such as a hailstorm, which can cause numerous dents all over the vehicle. Dents 302 can cover a distinct are of the vehicle or cover much of the vehicle, including one particular panel 310 that is the car's hood. A vehicle owner having a smart phone 132 equipped with application program 180 that enables depth and dimension identifying photography takes an image of panel 310 that includes a number of dents 302. A cropped image 312 of panel 310 containing a plurality of dents 302 is generated by application program 180. The vehicle owner can then transmit the data file containing cropped image 312 to estimate platform 102, where the image is stored and processed according to the methods herein described. As discussed, an image and subsequently cropped image are sent to estimate platform 102 by the insurer and repair shop as well. Several such images are taken by the vehicle owner and cropped images of this sort are created and sent to estimate platform in order to provide an accurate account of the number of dents and their location. This processing enables generation of an estimate for the repair work by extracting precise measurements of the dents to be repaired and the volume and number of dents on the vehicle.

Modifications, additions, or omissions can be made to the method depicted in FIG. 2. The method can include more, fewer, or other steps. For example, steps can be performed in parallel or in any suitable order. While discussed as estimate generating system 100 (or components thereof) performing the steps, any suitable component of the estimate generating system can perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

ADDITIONAL DISCLOSURE

Clause 1. An insurance claim information processing system, comprising:
a processor programmed to function as:
an acquisition unit that acquires vehicle damage information requiring repair from a plurality of uniquely identified vehicles having different vehicle damage regions, the vehicle damage information comprising images of vehicle damage information obtained from a depth and dimension measuring camera;
a job order generating unit that creates a repair job uniquely associated with the acquired vehicle damage information;
an association unit that correlates the job order to an insured claim;
a model generating unit that creates a three-dimensional model of the vehicle damage region representing a length, a width and a depth of the vehicle damage region;
a measuring unit that measures the length, the width and the depth of the vehicle damage region;
a three-dimensional model manipulator unit for revision of the three-dimensional model of the vehicle damage region;
an estimate assigning unit that assigns a cost estimate according to the measured length, width and depth of the vehicle damage region based on insured claim attributes associated with the insured claim and predefined parameters of the vehicle damage; and
a tagging unit that designates the cost estimate for periodic capture by an aggregation unit that creates a wide area matrix of vehicle damage repair pricing estimates.

Clause 2. The insurance claim information processing system of any proceeding or preceding clause, wherein the three-dimension model manipulator unit further comprises a toggle for identification of the vehicle damage region having more than a predefined number of areas for repair.

Clause 3. The insurance claim information processing system of any proceeding or preceding clause, wherein the insured claim attributes consist essentially of a make of the vehicle and a geographic location of the vehicle.

Clause 4. The insurance claim information processing system of any proceeding or preceding clause, wherein the predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle.

Clause 5. The insurance claim information processing system of any proceeding or preceding clause, wherein the processor resides in a smart phone.

Clause 6. The insurance claim information processing system of any proceeding or preceding clause, wherein the processor resides in a personal computer.

Clause 7. A non-transitory computer-readable information storage media, having stored thereon instructions, that when executed by one or more processors in a transceiver, cause to be performed a method comprising:
acquiring vehicle damage information requiring repair from a plurality of uniquely identified vehicles having different vehicle damage regions, the vehicle damage information comprising images of vehicle damage information obtained from a depth and dimension measuring camera;

generating a job order uniquely associated with the acquired vehicle damage information; correlating the job order to an insured claim;

generating a three-dimensional model of the vehicle damage region representing a length, a width and a depth of the vehicle damage region;

measuring unit the length, the width and the depth a the vehicle damage region;

manipulating the three-dimensional model for revision of the three-dimensional model of the vehicle damage region;

assigning a cost estimate according to the measured length, width and depth of the vehicle damage region based on insured claim attributes associated with the insured claim and predefined parameters of the vehicle damage; and designating the cost estimate for periodic capture by an aggregation unit that creates a wide area matrix of vehicle damage repair pricing estimates.

Clause 8. The non-transitory computer-readable information storage media of any proceeding or preceding clause, wherein the manipulating of the three-dimension model manipulator unit further comprises activating identification of the vehicle damage region having more than a predefined number of areas for repair.

Clause 9. The non-transitory computer-readable information storage media of any proceeding or preceding clause, wherein the insured claim attributes consist essentially of a make of the vehicle and a geographic location of the vehicle.

Clause 10. The non-transitory computer-readable information storage media of any proceeding or preceding clause, wherein the predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle.

Clause 11. The non-transitory computer-readable information storage media of any proceeding or preceding clause, wherein the processor resides in a smart phone.

Clause 12. The non-transitory computer-readable information storage media of any proceeding or preceding clause, wherein the processor resides in a personal computer.

Clause 13. An insurance claim processing system, comprising:

a depth and dimension measuring camera;

a transceiver for transmitting images of vehicle damage captured by the depth and dimension measuring camera;

a three-dimensional model module for creating a three-dimensional model of the vehicle damage images captured by the depth and dimension measuring camera;

a manipulation module for modifying the three-dimensional model;

a database for storage of information associated with an insured claim uniquely associated with each image of vehicle damage captured by the depth and dimension measuring camera;

an estimate calculator for assigning a cost estimate to a job created for repair of the vehicle damage according to comparison of vehicle damage attributes and predefined estimate attributes; and an estimate aggregator for periodically collecting select cost estimates and supplementing a pre-existing wide area estimate resource.

Clause 14. The insurance claim processing system of any proceeding or preceding clause, wherein the manipulating of the three-dimension model manipulator unit further comprises activating identification of the vehicle damage region having more than a predefined number of areas for repair.

Clause 15. The insurance claim processing system of any proceeding or preceding clause, wherein the insured claim attributes consist essentially of a make of the vehicle and a geographic location of the vehicle.

Clause 16. The insurance claim processing system of any proceeding or preceding clause, wherein the predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle.

Clause 17. The insurance claim processing system of any proceeding or preceding clause, wherein the processor resides in a smart phone.

Clause 18. The insurance claim processing system of any preceding clause, wherein the processor resides in a personal computer.

What is claimed is:

1. An insurance claim information processing system, comprising:

a processor programmed to function as:

an acquisition unit that acquires vehicle damage information requiring repair from a plurality of uniquely identified vehicles having different vehicle damage regions, the vehicle damage information comprising images of vehicle damage information obtained from a depth and dimension measuring camera;

a job order generating unit that creates a repair job uniquely associated with the acquired vehicle damage information;

an association unit that correlates the job order to an insured claim;

a model generating unit that creates a three-dimensional model of the vehicle damage region representing a length, a width and a depth of the vehicle damage region;

a measuring unit that measures the length, the width and the depth of the vehicle damage region;

a three-dimensional model manipulator unit for revision of the three-dimensional model of the vehicle damage region;

an estimate assigning unit that assigns a cost estimate according to the measured length, width and depth of the vehicle damage region based on insured claim attributes associated with the insured claim and predefined parameters of the vehicle damage; and a tagging unit that designates the cost estimate for periodic capture by an aggregation unit that creates a wide area matrix of vehicle damage repair pricing estimates.

2. The insurance claim information processing system of claim 1, wherein the three-dimension model manipulator unit further comprises a toggle for identification of the vehicle damage region having more than a predefined number of areas for repair.

3. The insurance claim information processing system of claim 1, wherein the insured claim attributes consist essentially of a make of the vehicle and a geographic location of the vehicle.

4. The insurance claim information processing system of claim 1, wherein the predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle.

5. The insurance claim information processing system of claim 1, wherein the processor resides in a smart phone.

6. The insurance claim information processing system of claim 1, wherein the processor resides in a personal computer.

7. A non-transitory computer-readable information storage media, having stored thereon instructions, that when executed by one or more processors in a transceiver, cause to be performed a method comprising:
    acquiring vehicle damage information requiring repair from a plurality of uniquely identified vehicles having different vehicle damage regions, the vehicle damage information comprising images of vehicle damage information obtained from a depth and dimension measuring camera;
    generating a job order uniquely associated with the acquired vehicle damage information;
    correlating the job order to an insured claim;
    generating a three-dimensional model of the vehicle damage region representing a length, a width and a depth of the vehicle damage region;
    measuring unit the length, the width and the depth of the vehicle damage region;
    manipulating the three-dimensional model for revision of the three-dimensional model of the vehicle damage region;
    assigning a cost estimate according to the measured length, width and depth of the vehicle damage region based on insured claim attributes associated with the insured claim and predefined parameters of the vehicle damage; and
    designating the cost estimate for periodic capture by an aggregation unit that creates a wide area matrix of vehicle damage repair pricing estimates.

8. The non-transitory computer-readable information storage media of claim 7, wherein the manipulating of the three-dimension model manipulator unit further comprises activating identification of the vehicle damage region having more than a predefined number of areas for repair.

9. The non-transitory computer-readable information storage media of claim 7, wherein the insured claim attributes consist essentially of a make of the vehicle and a geographic location of the vehicle.

10. The non-transitory computer-readable information storage media of claim 7, wherein the predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle.

11. The non-transitory computer-readable information storage media of claim 7, wherein the processor resides in a smart phone.

12. The non-transitory computer-readable information storage media of claim 7, wherein the processor resides in a personal computer.

13. An insurance claim processing system, comprising:
    a depth and dimension measuring camera;
    a transceiver for transmitting images of vehicle damage captured by the depth and dimension measuring camera;
    a three-dimensional model module for creating a three-dimensional model of the vehicle damage images captured by the depth and dimension measuring camera;
    a manipulation module for modifying the three-dimensional model;
    a database for storage of information associated with an insured claim uniquely associated with each image of vehicle damage captured by the depth and dimension measuring camera;
    an estimate calculator for assigning a cost estimate to a job created for repair of the vehicle damage according to comparison of vehicle damage attributes and predefined estimate attributes; and
    an estimate aggregator for periodically collecting select cost estimates and supplementing a pre-existing wide area estimate resource.

14. The insurance claim processing system of claim 13, wherein the manipulating of the three-dimension model manipulator unit further comprises activating identification of the vehicle damage region having more than a predefined number of areas for repair.

15. The insurance claim processing system of claim 13, wherein the insured claim attributes consist essentially of a make of the vehicle and a geographic location of the vehicle.

16. The insurance claim processing system of claim 13, wherein the predefined parameters of the vehicle damage consist essentially of a number of items in need of repair, a concentration of items in need of repair within the vehicle damage region, a make of the vehicle, a geographic location of the vehicle, and a labor cost associated with the geographic location of the vehicle.

17. The insurance claim processing system of claim 13, wherein the processor resides in a smart phone.

18. The insurance claim processing system of claim 13, wherein the processor resides in a personal computer.

* * * * *